(12) United States Patent
Koga et al.

(10) Patent No.: US 8,677,848 B2
(45) Date of Patent: Mar. 25, 2014

(54) SPEED REDUCTION DEVICE FOR POWER SEAT

(75) Inventors: Yoshitaka Koga, Chiryu (JP); Eiichiro Tsuji, Gifu (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 262 days.

(21) Appl. No.: 12/748,708

(22) Filed: Mar. 29, 2010

(65) Prior Publication Data
US 2010/0300228 A1 Dec. 2, 2010

(30) Foreign Application Priority Data
May 26, 2009 (JP) .................... 2009-126031

(51) Int. Cl.
*F16H 1/16* (2006.01)
*F16H 1/20* (2006.01)
(52) U.S. Cl.
USPC ............... 74/425; 297/311; 297/362.11
(58) Field of Classification Search
USPC ......... 74/424, 427, 410, 424.5, 412 R, 458.5, 74/425, 606 R; 297/311, 312, 330, 334.17, 297/344.2, 344.23, 362.11
See application file for complete search history.

(56) References Cited

U.S. PATENT DOCUMENTS

| | | | | |
|---|---|---|---|---|
| 4,944,554 A | * | 7/1990 | Gross et al. ................. | 297/284.3 |
| 5,398,564 A | * | 3/1995 | Yoshida et al. ................. | 74/425 |
| 5,511,330 A | * | 4/1996 | Havens ............................ | 40/505 |
| 5,727,847 A | * | 3/1998 | Martone et al. ................ | 297/375 |
| 6,390,264 B2 | | 5/2002 | Torii et al. | |
| 6,450,056 B2 | * | 9/2002 | Torii et al. ....................... | 74/427 |
| 6,463,829 B2 | * | 10/2002 | Torii et al. ..................... | 74/606 R |
| 6,481,306 B2 | * | 11/2002 | Adachi et al. ................... | 74/425 |
| 6,481,550 B2 | * | 11/2002 | Yamamoto et al. ............. | 192/44 |
| 6,712,727 B2 | * | 3/2004 | Kujira et al. ................... | 475/149 |
| 6,880,424 B2 | * | 4/2005 | McMillen ................... | 74/500.5 |
| 7,275,791 B2 | * | 10/2007 | Sakamaki ................ | 297/362.14 |

(Continued)

FOREIGN PATENT DOCUMENTS

JP 61-165064 U 10/1986
JP 8-266010 A 10/1996

OTHER PUBLICATIONS

U.S. Appl. No. 12/835,296, filed Jul. 13, 2010, Koga.

(Continued)

*Primary Examiner* — Justin Krause
*Assistant Examiner* — Alexander Vu
(74) *Attorney, Agent, or Firm* — Oblon, Spivak, McClelland, Maier & Neustadt, L.L.P.

(57) ABSTRACT

A speed reduction device for a power seat adapted to be fixed to a seat frame, the speed reduction device includes a worm gear rotating with a motor output shaft, a helical gear meshed with the worm gear and rotating with a drive shaft driving a movable portion of the power seat, and a casing accommodating the worm gear and the helical gear. The casing includes a casing body rotatably supporting the worm gear, a casing cover tightened to the casing body, annular fitting portions fitted to each other, a first engagement portion formed at an outer circumferential side of the annular fitting portion of one of the casing body and the casing cover, a second engagement portion formed at the other of the casing body and the casing cover and engaging with the first engagement portion, and a tightening means tightening the casing cover to the casing body.

15 Claims, 7 Drawing Sheets

(56) References Cited

U.S. PATENT DOCUMENTS

| | | | |
|---|---|---|---|
| 7,291,951 B2* | 11/2007 | Takiguchi et al. | 310/75 R |
| 2005/0115343 A1* | 6/2005 | Sakamaki | 74/89.23 |
| 2006/0243078 A1* | 11/2006 | Sesita et al. | 74/425 |
| 2006/0254376 A1* | 11/2006 | Ota et al. | 74/425 |
| 2007/0295135 A1* | 12/2007 | Kidowaki | 74/425 |
| 2007/0295160 A1* | 12/2007 | Mizutani | 74/606 R |
| 2008/0022477 A1* | 1/2008 | Ota | 15/250.34 |
| 2009/0071280 A1* | 3/2009 | Nakagawa | 74/425 |
| 2010/0060061 A1 | 3/2010 | Koga et al. | |
| 2010/0060062 A1 | 3/2010 | Koga et al. | |
| 2010/0300228 A1* | 12/2010 | Koga et al. | 74/425 |

OTHER PUBLICATIONS

Office Action issued Mar. 26, 2013 in Japanese patent Application No. 2009-126031 (with English translation).

* cited by examiner

SPEED REDUCTION DEVICE FOR POWER SEAT

CROSS REFERENCE TO RELATED APPLICATIONS

This application is based on and claims priority under 35 U.S.C. §119 to Japanese Patent Application 2009-126031, filed on May 26, 2009, the entire content of which is incorporated herein by reference.

TECHNICAL FIELD

This disclosure relates to a speed reduction device for a power seat.

BACKGROUND DISCUSSION

A known power seat apparatus for a vehicle includes a speed reduction device that reduces a rotational speed of an output shaft of a drive source such as an electric motor and then transmits the resulting rotational speed (i.e., the rotation) to a drive shaft driving a movable portion of the power seat. U.S. Pat. No. 6,390,264B2 (hereinafter referred to as Reference 1) discloses such speed reduction device including a casing constituted by two members, i.e., a holding member (a casing body) and a cover member (casing cover). The holding member holds a worm gear and a helical gear that perform a speed reduction operation in a rotatable manner. The cover member covers the holding member. Then, four engagement projections are formed at an outer circumference of the cover member while engagement portions are formed at the holding member so as to face the respective engagement portions. A worm gear that rotates in the same direction and at the same speed as those of the output shaft of the motor (i.e., the motor output shaft) is assembled on an end portion of the holding member. A helical gear having an axial center perpendicular to an axial center of the worm gear and meshed with the worm gear is assembled on the holding member. The cover member is attached to the holding member in such a manner that the engagement projections of the cover member engage with the respective engagement portions of the holding member, the engagement portions then being riveted to thereby fix the cover member to the holding member. Accordingly, the casing of the speed reduction device is constituted by the two members in order to simplify an assembly of the worm gear and the helical gear. Besides the riveting, a fixing method of the two members may be generally achieved by a tightening with multiple small screws. In addition, in a case of mounting the speed reduction device itself to a seat frame, for example, fitting screws penetrate through three engagement holes formed at an outer peripheral portion of the holding member so that the holding member is meshed with the seat frame as disclosed in Reference 1.

However, according to the speed reduction device disclosed in Reference 1, the attachment of the cover member to the holding member and the assembly of the speed reduction device itself on the seat frame are separately and independently performed from each other. Thus, exclusive components and processes are necessary for attaching the cover member to the holding member and for assembling the speed reduction device itself on the seat frame, thereby increasing the number of components and processing. In addition, because the helical gear receives a large radial load and a thrust load from the worm gear, the casing is required to have a high bearing rigidity for holding both the worm gear and the helical gear so that a stable mesh between the gears is ensured. As a result, the holding member and the cover member after being attached to constitute the casing are both required to have a high holding force. Further, a general requirement for quickly and precisely assemble the holding member and the cover member on each other is still present.

A need thus exists for a speed reduction device for a power seat which is not susceptible to the drawback mentioned above.

SUMMARY

According to an aspect of this disclosure, a speed reduction device for a power seat adapted to be fixed to a seat frame, the speed reduction device includes a worm gear coaxially and integrally rotating with an output shaft of a motor, a helical gear meshed with the worm gear and coaxially and integrally rotating with a drive shaft driving a movable portion of the power seat, and a casing accommodating the worm gear and the helical gear to be rotatable. The casing includes a casing body rotatably supporting the worm gear and including a circular-shaped opening portion through which the helical gear is inserted, a casing cover tightened to the casing body and closing the opening portion of the casing body, annular fitting portions formed at contact surfaces of the casing body and the casing cover respectively and fitted to each other, a first engagement portion formed at an outer circumferential side of the annular fitting portion of one of the casing body and the casing cover, a second engagement portion formed at the other of the casing body and the casing cover and engaging with the first engagement portion, and a tightening means tightening the casing cover to the casing body.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A speed reduction device according to a first embodiment applied to a seat tilt apparatus for a vehicle seat apparatus will be explained. In the following, directions and orientations such as front and rear (i.e., a longitudinal direction), left and right (i.e., a width direction), and top and bottom correspond to those when viewed from a passenger seated on a seat (i.e., a power seat) for a vehicle. Further, in the following, the seat tilt apparatus provided at a right side of the seat will be mainly explained as an example.

Figure 1:
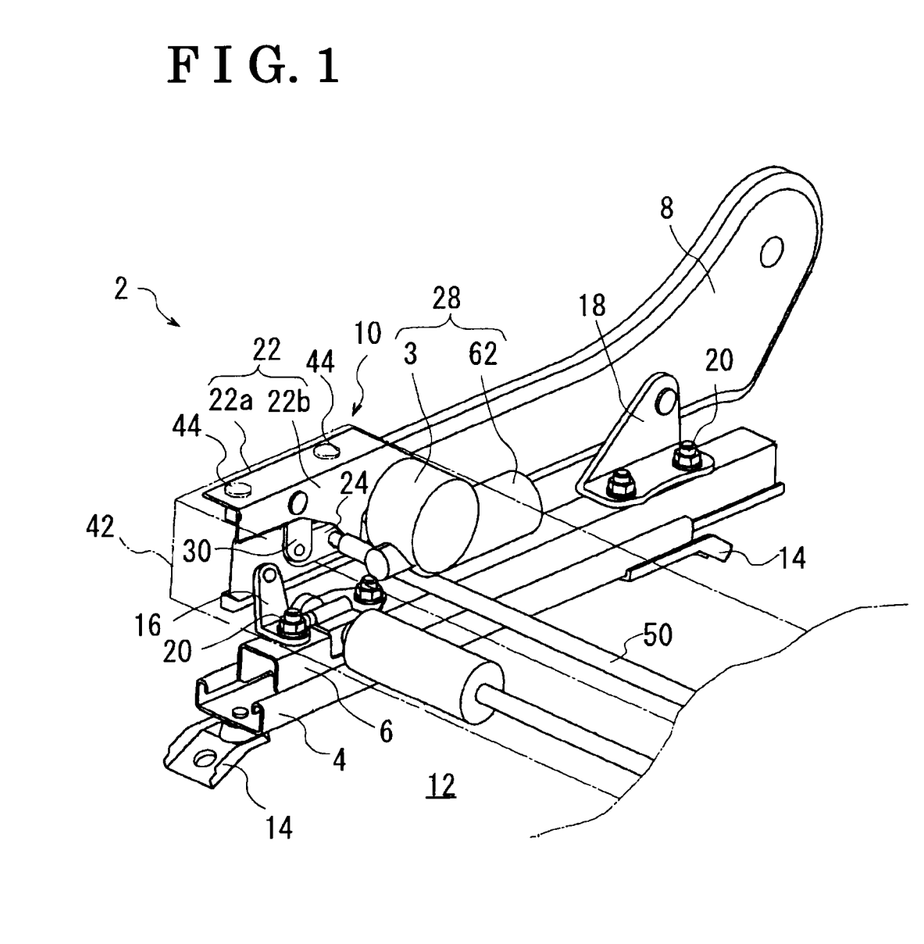
FIG. 1 is a perspective view of a seat apparatus for a vehicle equipped with a seat tilt apparatus including a speed reduction device according to a first embodiment disclosed here.

As illustrated in FIG. 1, a seat apparatus 2 for a vehicle includes a lower rail 4, an upper rail 6, a lower arm 8 at which a seat cushion is mounted, and a seat tilt apparatus 10. The seat tilt apparatus 10 includes a motor drive unit 28, which includes a speed reduction device 3. According to the seat apparatus 2, the lower rail 4 that extends in a longitudinal direction of the vehicle is fixed to a floor 12 for a vehicle via brackets 14. The upper rail 6 is slidably assembled on the lower rail 4. A relative sliding of the upper rail 6 to the lower rail 4 is changeable between a locked state and an unlocked state by a lock and unlock mechanism. The lower arm 8 is assembled on an upper portion of the upper rail 6 by bracket members 16, 18, bolts and nuts 20, and the like. An upper arm of a seat back is assembled on an upper rear portion of the lower arm 8 via a reclining mechanism so as to be rotatable relative to the lower arm 8.

Figure 2:
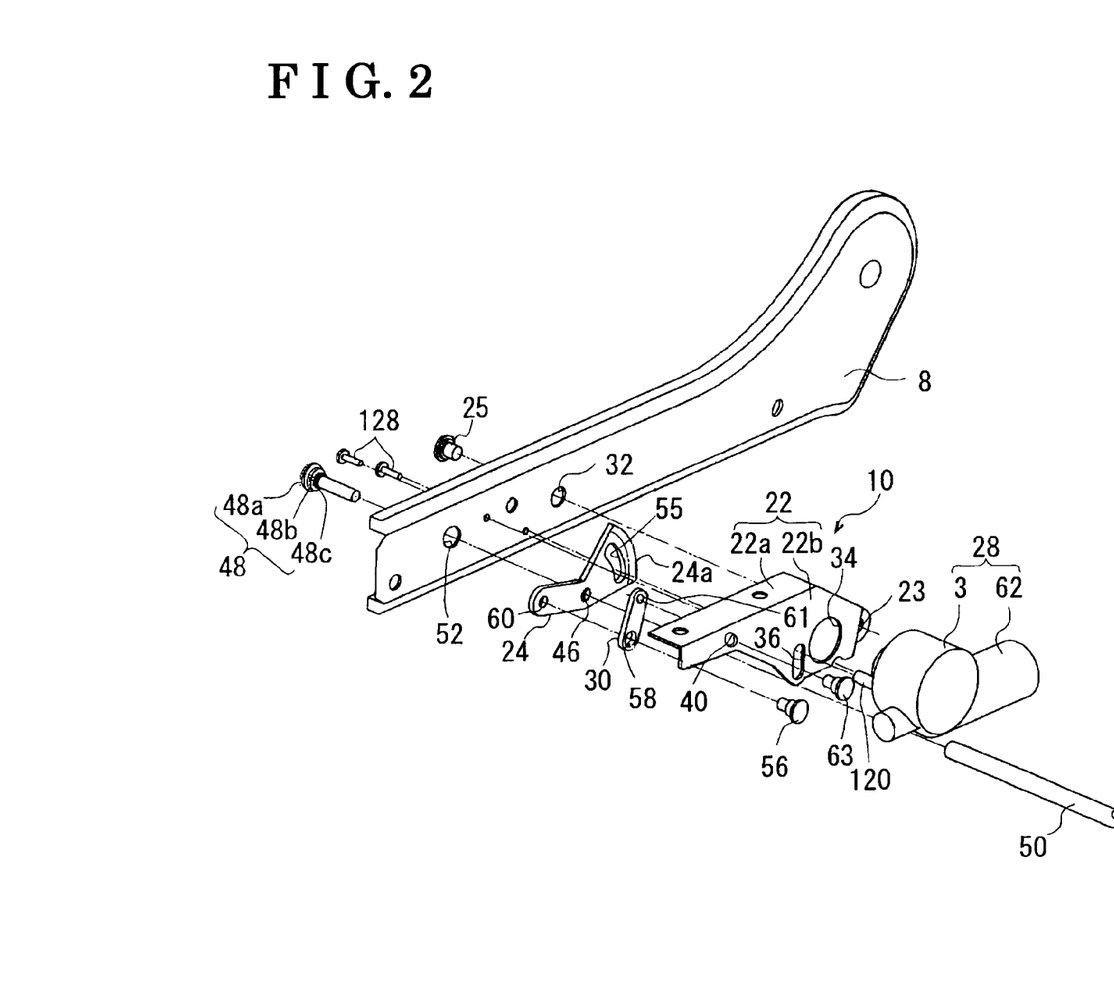
FIG. 2 is an exploded perspective view of the seat apparatus.

The seat tilt apparatus 10 is mounted at a front portion of the lower arm 8. As illustrated in FIGS. 1 and 2, the seat tilt apparatus 10 includes a side frame plate 22, a sector gear 24, a pinion gear 26 (see FIGS. 3 and 4) meshed with an external gear 24a formed at a first end of the sector gear 24, the motor drive unit 28 driving the pinion gear 26, and a swing link member 30 connected to a second end of the sector gear 24. The side frame plate 22 includes a top plate portion 22a and a side plate portion 22b bending to form an angle therebetween. The side frame plate 22 is pivotally supported by the lower arm 8 at a rotation center bore 23 formed at a rear end of the side plate portion 22b. That is, a fitting screw 25 is inserted into the rotation center bore 23 of the side frame plate 22 and a fitting bore 32 formed at an inner side surface of the lower arm 8. As illustrated in FIG. 2, the side plate portion 22b includes a through-hole 34 into which the pinion gear 26 is inserted, en elongated hole 36 into which one of a pair of support projections 120 (which will be explained later) provided to attach the motor drive unit 28 to the lower arm 8 is inserted, and a pivot bore 40 with which one end portion (i.e., a support hole 61) of the swing link member 30 engages.

As illustrated in FIG. 1, a front edge panel 42 serving as a movable portion of the power seat is fixed to the top plate portion 22a of the side frame plate 22 by rivets 44. Alternatively, the front edge panel 42 may be directly formed at the side frame plate 22. The front edge panel 42 constitutes a portion of a cushion frame to which a lower surface of the seat cushion is fixed.

A rotation center hole 46 is formed at a center of the sector gear 24 as illustrated in FIG. 2. The external gear 24a having an arc shape and meshed with the pinion gear 26 is formed at the first end of the sector gear 24. In addition, an operation hole 60 is formed at the second end of the sector gear 24 so as to be connected to the swing link member 30. Further, a guide groove 55 is formed at the sector gear 24 so as to extend along the external gear 24a having the arc shape. One of the support projections 120 is inserted into the guide groove 55 to thereby guide the swing operation of the sector gear 24. A fixed screw 48, which includes a flange portion 48a, a peripheral smooth portion 48b and a serration portion 48c in the above mentioned order from a base portion, is inserted into the rotation center hole 46 in such a manner that the serration portion 48c is assembled on the rotation center hole 46 without relatively rotating thereat. The serration portion 48c of the fixed screw 48 is further fitted to an end portion of a drive transmission rod 50 in such a manner that the fixed screw 48 is prevented from rotating relative to the drive transmission rod 50. The drive transmission rod 50 transmits a drive torque to another seat tilt apparatus that is provided at a left side of the seat and that includes a lifter link member, a swing link member, a side frame plate, and the like. The peripheral smooth portion 48b of the fixed screw 48 is pivotally supported by a fitting hole 52 of the lower arm 8. The pinion gear 26 of the motor drive unit 28 is meshed with the external gear 24a, having the arc shape, of the sector gear 24.

Figure 3:
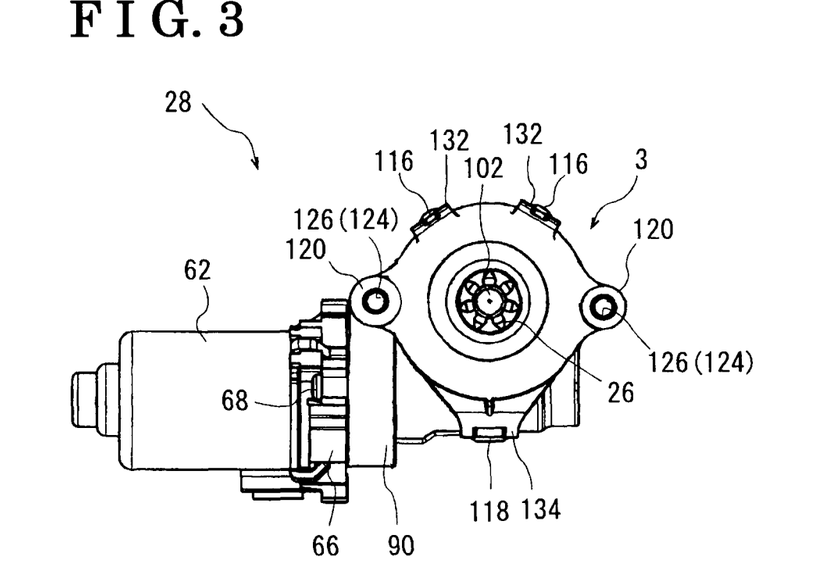
FIG. 3 is a front view of a motor drive unit of the seat tilt apparatus.
Figure 4:
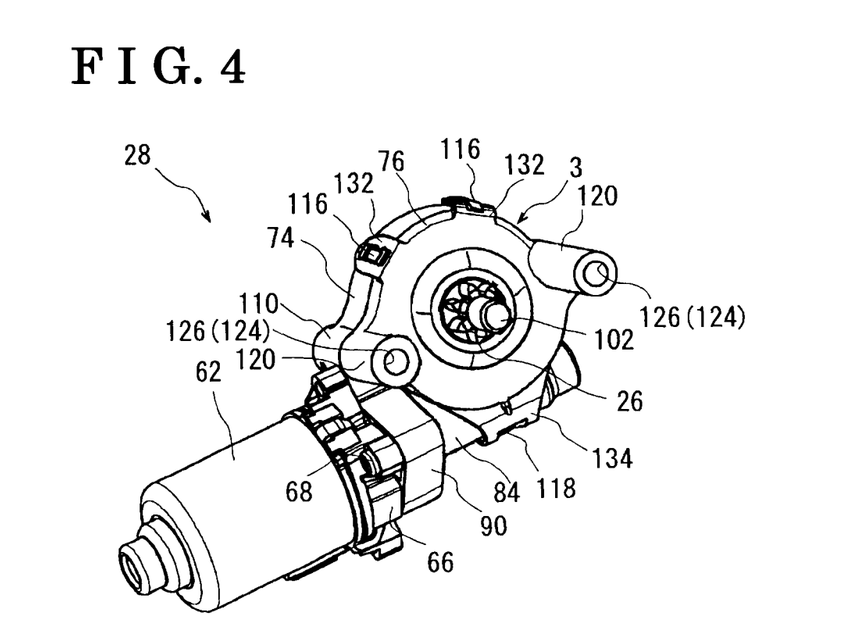
FIG. 4 is a perspective view of the motor drive unit of the seat tilt apparatus.

The motor drive unit 28 includes an electric motor (motor) 62 and the speed reduction device 3 as illustrated in FIGS. 3 and 4. The motor drive unit 28 is mounted at the lower arm 8 via the two support projections 120, which project in the width direction of the vehicle and into which screw members 128 are inserted respectively. An assembly edge portion 66 is formed at an outer periphery of the motor 62 while facing the speed reduction device 3. In addition, four assembly holes 70 (see FIG. 6) into which assembly screws 68 penetrate are formed at the assembly edge portion 66. An output shaft is formed in a projecting manner at a portion of the motor 62 facing the speed reduction device 3. Then, a serration fitting hole is formed at an end portion of the output shaft of the motor 62 (i.e., the motor output shaft). The serration fitting hole of the output shaft is fitted to a serration portion formed at one end of a worm gear 72 provided at the speed reduction device 3 to thereby integrally connect the motor output shaft to the worm gear 72.

Figure 5:
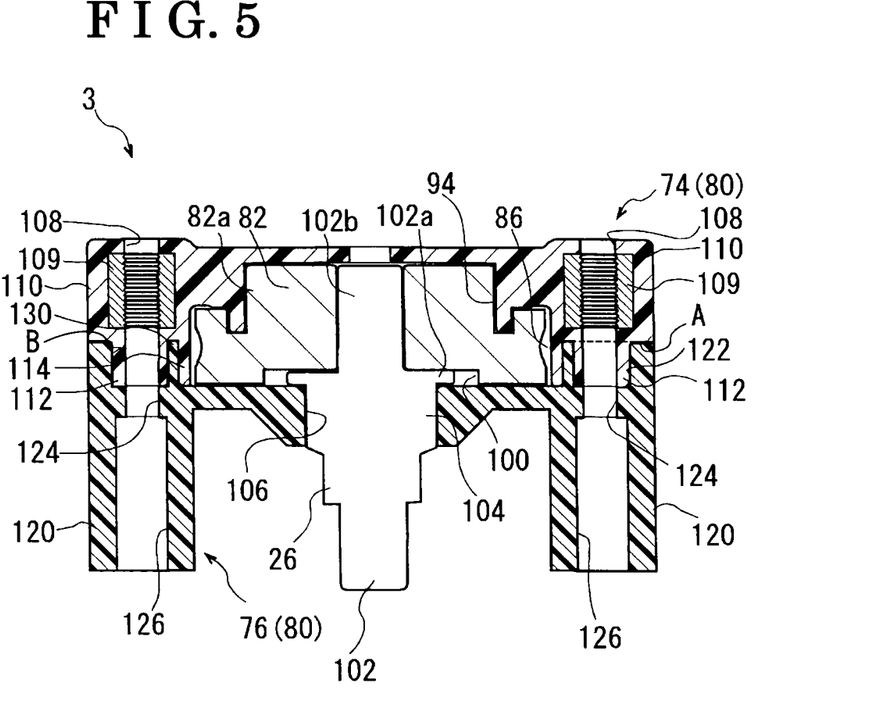
FIG. 5 is a cross-sectional view of the speed reduction device.
Figure 6:
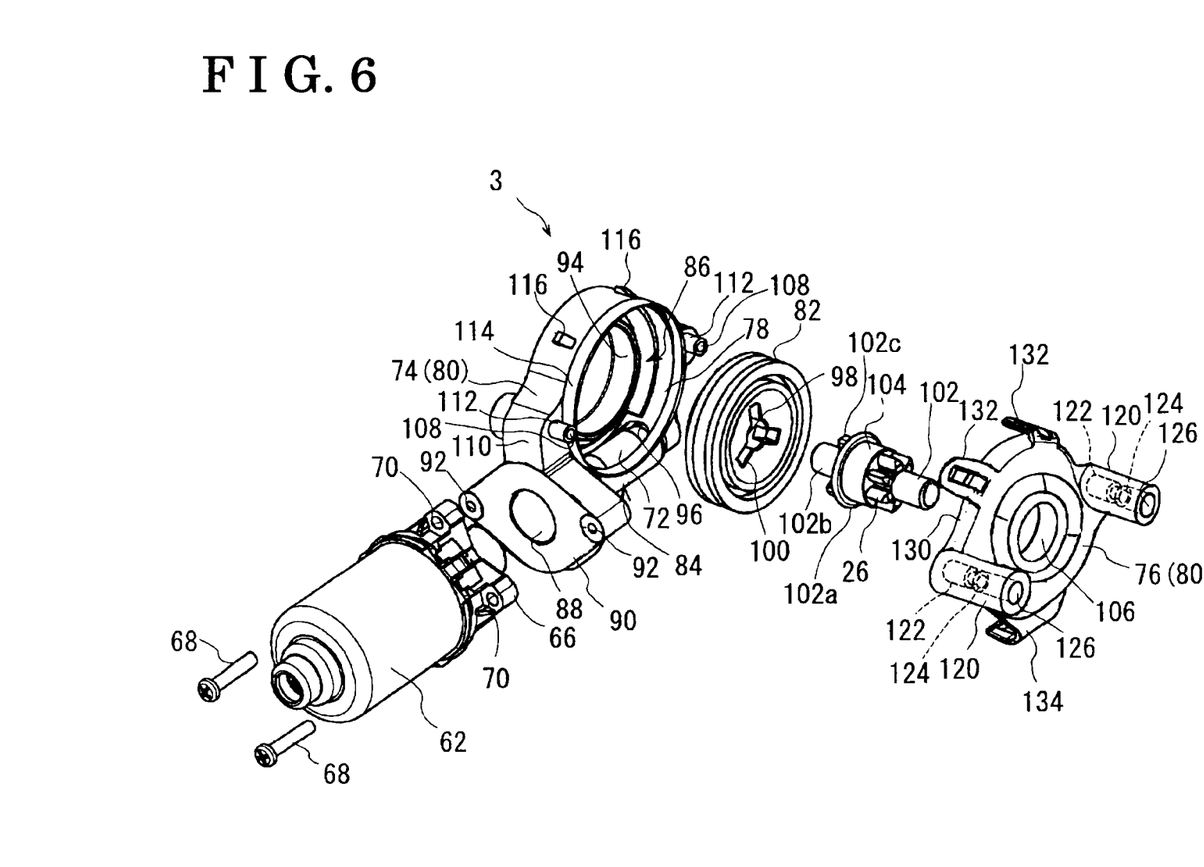
FIG. 6 is an exploded perspective view of the speed reduction device.

The speed reduction device 3 includes a casing 80 constituted by a casing body 74 and a casing cover 76 that closes a circular-shaped opening portion 78 of the casing body 74, the worm gear 72 accommodated within the casing body 74 and connected to the output shaft of the motor 62, and a helical gear 82 meshed with the worm gear 72. The casing body 74 and the casing cover 76 are each formed by ABS (acrylonitrile butadiene styrene) resin, for example. The casing body 74 includes a worm gear accommodating portion 84 and a helical gear accommodating portion 86. Front and rear bearings are formed at the worm gear accommodating portion 84 so as to rotatably support both axial ends of the worm gear 72. An assembly flange portion 90 is arranged adjacent to the worm gear accommodating portion 84 so as to face the motor 62. The assembly flange portion 90 includes a first opening portion 88 that opens in an axial direction of the worm gear 72. The assembly flange portion 90 also includes two screw clamp holes 92 at positions facing the respective assembly holes 70 (see FIG. 6). The motor output shaft is inserted into the first opening portion 88 in such a manner that the end portion of the motor output shaft is connected to the worm gear 72. The helical gear 82 is accommodated and arranged within the helical gear accommodating portion 86 in such a manner that an axis of the helical gear 82 is perpendicular to an axis of the worm gear 72. As illustrated in FIG. 5, a shaft portion 82a having a short-length column shape is formed at one side of the helical gear 82 in a projecting manner and is rotatably supported by a body side bearing portion 94 of the helical gear accommodating portion 86. A second opening portion 96 is formed between the worm gear accommodating portion 84 and the helical gear accommodating portion 86 as illustrated in FIG. 6 and at which the worm gear 72 and the helical gear 82 are meshed with each other. The helical gear 82 includes three engagement grooves 100 at equal distances around an axial center hole 98 of the helical gear 82. An output pinion gear 102 serving as a drive shaft is fitted, via a first end, to the axial center hole 98 and the engagement grooves 100 so that the output pinion gear 102 is prevented from rotating with the helical gear 82. As illustrated in FIGS. 5 and 6, a flange portion 102a is formed substantially at a center of the output pinion gear 102 along the circumferential direction so as to receive a thrust load of the helical gear 82. In addition, an insertion shaft 102b is formed at the first end of the output pinion gear 102 and three engagement fitting portions 102c are formed at equal intervals along the flange portion 102a. The insertion shaft 102b is inserted into the axial center hole 98 of the helical gear 82 while the engagement fitting portions 102c engage with the respective engagement grooves 100 of the helical gear 82. Accordingly, the helical gear 82 and the output pinion gear 102 integrally rotate. The pinion gear 26 is formed at a shaft portion at a second end of the output pinion gear 102 and is meshed with the external gear 24a of the sector gear 24. A peripheral smooth shaft portion 104 is formed, being in contact with the flange portion 102a at an intermediate portion of the output pinion gear 102. The output pinion gear 102 is rotatably supported by a cover side bearing portion 106 of the casing cover 76 at the peripheral smooth shaft portion 104.

As illustrated in FIGS. 5 and 6, a pair of padding portions 110 serving as first assembly portions are formed at an outer circumferential side of the opening portion 78 of the casing body 74. Cylindrical projections 112 serving as first engagement portions are integrally formed at respective contact surfaces A of the padding portions 110 relative to the casing cover 76. Screw clamp holes 108 serving as cylindrical holes are formed at the respective cylindrical projections 112 so as to penetrate therethrough. Internal thread members 109 made of metal are provided at the respective screw clamp holes 108 by insert molding. Then, the screw members 128 (see FIG. 2) are meshed with the respective internal thread members 109. A first fitting edge 114 projecting towards the casing cover 76 is formed at an inner edge of the circular-shaped opening portion 78. A pair of engagement hooks 116 is formed at an upper outer circumferential side of the casing body 74 while an engagement portion 118 (see FIGS. 3 and 4) is formed at an outer periphery of the worm gear accommodating portion 84 positioned at a lower outer circumferential side of the casing body 74.

The support projections 120 serving as second assembly portions are formed at portions of the casing cover 76 facing the respective padding portions 110 so as to project in a direction opposite from the padding portions 110. A pair of projection insertion bores (i.e., circular holes) 122 which serves as second engagement portions and into which the respective cylindrical projections 112 are inserted are formed at the support projections 120 so as to face the padding portions 110. That is, the projection insertion bores 122 are formed, opening at respective contact surfaces B relative to the casing body 74. Next, through-holes 124 are formed behind the respective projection insertion bores 122, i.e., in a direction away from the padding portions 110, while each having a larger diameter than that of the screw clamp hole 108. Thus, in a case where the cylindrical projections 112 are inserted into the respective projection insertion bores 122, each of the through-holes 124 and each of the screw clamp holes 108 are connected to each other. Guide holes 126 each having a larger diameter than that of the through-hole 124 are formed at the respective support projections 120 while facing the lower arm 8. The guide holes 126 are connected to the respective through-holes 124. The screw members 128 are inserted into the respective support projections 120 from a side where the lower arm 8 is mounted and are meshed with the internal thread members 109 of the screw clamp holes 108 of the respective cylindrical projections 112 to thereby mount the speed reduction device 3 to the lower arm 8. At this time, the through-holes 124 and the guide holes 126 of the respective support projections 120 are all larger in diameter than the screw clamp hole 108. Thus, the screw members 128 are loosely in contact with the through-holes 124 and the guide holes 126. Therefore, when the screw members 128 are tightened, the casing cover 76 is tightened while being sandwiched between the casing body 74 and the lower arm 8. The screw members 128 and the internal thread members 109 constitute a tightening means. A second fitting edge 130 is formed at the casing cover 76 so as to follow an outer periphery of the first fitting edge 114. The first fitting edge 114 and the second fitting edge 130 constitute annular fitting portions.

A pair of engagement arms 132 is formed at an upper outer circumferential side of the casing cover 76 so as to project towards the casing body 74 and to be engageable with the pair of engagement hooks 116 of the casing body 74. A strip-shaped engagement portion 134 is formed at a lower outer circumferential side of the casing cover 76 so as to project towards the casing body 74 and to be engageable with the engagement portion 118 of the casing body 74. The engagement hooks 116 and the engagement arms 132, and the engagement portion 118 and the strip-shaped engagement portion 134 achieve a temporary joint state where the casing body 74 and the casing cover 76 are assembled on each other before being mounted at the lower arm 8. Because the casing body 74 and the casing cover 76 are handled as a unit in the temporary joint state, operation efficiency when the casing 80 is mounted at the lower arm 8 may be enhanced.

As illustrated in FIG. 2, the swing link member 30 includes a connection hole 58 at the other end and the support hole 61 at one end. A connection screw 56 is inserted into the connection hole 58 in addition to the operation hole 60 formed at the second end of the sector gear 24 so that the sector gear 24 and the swing link member 30 are connected in a relatively rotatable manner. The support hole 61 formed at one end of the swing link member 30 is connected to the pivot bore 40 of the side frame plate 22 by a support screw 63 so that the swing link member 30 is rotatable relative to the side frame plate 22.

An assembly of the speed reduction device having the aforementioned structure will be explained. As illustrated in FIG. 6, the worm gear 72 is inserted into the first opening portion 88 of the casing body 74 so that the worm gear 72 is assembled on the worm gear accommodating portion 84. At this time, the both axial ends of the worm gear 72 are rotatably supported by the respective front and rear bearing portions. Next, the helical gear 82 is inserted into the opening portion 78 of the casing body 74 so that the helical gear 82 is assembled on the helical gear accommodating portion 86. At this time, the helical gear 82 and the worm gear 72 are arranged in such a manner that the axis of the helical gear 82 is perpendicular to the axis of the helical gear 82 and an external gear of the helical gear 82 is meshed with an external gear of the worm gear 72. Then, as illustrated in FIG. 5, the shaft portion 82a of the helical gear 82 is rotatably supported by the body side bearing portion 94 and thereby accommodating the helical gear 82 within the helical gear accommodating portion 86 (see FIG. 6). Next, the insertion shaft 102b of the output pinion gear 102 is inserted into the axial center hole 98 of the helical gear 82 so that the engagement fitting portions 102c engage with the respective engagement grooves 100 formed around the axial center hole 98. As a result, the output pinion gear 102 engages with the helical gear 82 so as not to be rotatable relative thereto.

As illustrated in FIG. 6, the opening portion 78 of the casing body 74 where the helical gear 82 and the output pinion gear 102 are accommodated is closed by the casing cover 76. In doing so, first, an attachment position between the casing body 74 and the casing cover 76 in a direction perpendicular to an attachment direction therebetween is accurately determined and guided by a mating between the first fitting edge 114 of the casing body 74 and the second fitting edge 130 of the casing cover 76. Next, the projection insertion bores 122 formed at the support projections 120 of the casing cover 76 are positioned to face the cylindrical projections 112 formed at the respective padding portions 110 of the casing body 74 so as to determine the attachment position between the casing body 74 and the casing cover 76 in a direction where the first fitting edge 114 and the second fitting edge 130 rotate relative to each other along the circular-shaped opening portion 78. Afterwards, the casing body 74 and the casing cover 76 are attached to each other. At this time, the engagement hooks 116 of the casing body 74 engage with the respective engagement arms 132 of the casing cover 76 while the strip-shaped engagement portion 134 of the casing cover 76 engages with the engagement portion 118 of the casing body 74, which leads to the temporary joint state where the attachment between the casing body 74 and the casing cover 76 is maintained. According to the temporary joint state, the casing body 74 and the casing cover 76 are obtained as a single casing 80. When the casing body 74 and the casing cover 76 are attached to each other, the peripheral smooth shaft portion 104 of the output pinion gear 102 is rotatably supported by the cover side bearing portion 106 of the casing cover 76. The pinion gear 26 of the output pinion gear 102 that projects from an opening of the cover side bearing portion 106 is meshed with the external gear 24a of the sector gear 24 when the speed reduction device 3 is mounted at the lower arm 8.

Next, the motor 62 is assembled on the speed reduction device 3. The motor output shaft is inserted into the first opening portion 88 of the casing body 74. The serration portion of the worm gear 72 is then fitted to the serration fitting hole formed at the end portion of the motor output shaft so that the motor output shaft and the worm gear 72 are connected to each other in an integrally rotating manner. The assembly holes 70 formed at the assembly edge portions 66 that are provided at the outer circumference of the motor 62 are coaxially arranged to face the pair of screw clamp holes 92 of the casing body 74. The speed reduction device 3 and the motor 62 are integrally assembled on each other by the assembly screws 68 inserted into the assembly holes 70 and the screw clamp holes 92.

Then, the motor drive unit 28, which is constituted by the speed reduction device 3 and the motor 62 integrally assembled on each other, is mounted at the lower arm 8 on which the sector gear 24, the swing link member 30 and the side frame plate 22 are assembled beforehand. At this time, the screw members 128 are inserted, from a side where the lower arm 8 is arranged, to the guide holes 126 and the through-holes 124 of the respective support projections 120, and the screw clamp holes 108 of the respective cylindrical projections 112. The screw members 128 are meshed with the internal thread members 109 of the screw clamp holes 108 to thereby mount the motor drive unit 28 at the lower arm 8. At the time of mounting the motor drive unit 28 at the lower arm 8, one of the support projections 120 is inserted into the elongated hole 36 of the side frame plate 22 and the output pinion 102 is inserted into the through-hole 34 of the side frame plate 22. Then, the pinion gear 26 of the output pinion gear 102 is meshed with the external gear 24a of the sector gear 24.

Next, an operation of the speed reduction device 3 having the aforementioned structure will be explained with reference to FIGS. 1 and 2. For example, in a case of raising the seat tilt apparatus 10, the motor 62 is driven so that a driving force thereof is transmitted via the speed reduction device 3 to the output pinion gear 102 which rotates accordingly (see FIG. 3). When the output pinion gear 102 rotates, the external gear 24a of the sector gear 24 meshed with the pinion gear 26 moves downward to thereby rotate the operation hole 60 of the sector gear 24 upward (i.e., the sector gear 24 rotates in the clockwise direction in FIG. 2). The swing link member 30, which is rotatably connected to the operation hole 60 at the connection hole 58, moves upward in association with the rotation of the sector gear 24. On the other hand, the support hole 61 of the swing link member 30 is connected to the pivot bore 40 of the side frame plate 22. Thus, in association with the upward movement of the swing link member 30, the side frame plate 22 rotates upward about the rotation center bore 23. Then, when the side frame plate 22 rotates upward, the front edge panel 42 fixed to the side frame plate 22 and a front portion of the seat cushion move upward. The operation of the seat tilt apparatus 10 is thus achieved.

According to the speed reduction device 3 having the aforementioned structure, the casing body 74 and the casing cover 76 are attached to each other via the first fitting edge 114 and the second fitting edge 130 formed at the respective contact surfaces A and B. Thus, the positioning of the casing body 74 and the casing cover 76 in the direction perpendicular to the attachment direction therebetween is easily conducted. In this case, the positioning in the direction where the casing body 74 and the casing cover 76 rotate relative to each other along the opening portion 78 is not achieved only by the first and second fitting edges 114 and 130. However, the cylindrical projections 112 formed at the outer circumferential side of the first fitting edge 114 and the projection insertion bores 122 formed at the outer circumferential side of the second fitting edge 130 are fitted to each other, thereby achieving the positioning of the casing body 74 and the casing cover 76 in the direction where the casing body 74 and the casing cover 76 rotate relative to each other along the opening portion 78. As a result, the position where the casing body 74 and the casing cover 76 are attached to each other is appropriately determined to thereby quickly and accurately assemble the casing body 74 and the casing cover 76 on each other. Further, the casing body 74 and the casing cover 76 are securely and strongly assembled on each other in a state where the first and second fitting edges 114 and 130 are fitted to each other and the cylindrical projections 112 are inserted into the projection insertion bores 122. As a result, a relative positional displacement between the casing body 74 and the casing cover 76 in the direction perpendicular to the attachment direction and the direction where the casing body 74 and the casing cover 76 rotate relative to each other may be restrained.

In addition, the cylindrical projections 112 are formed at the padding portions 110 where the casing cover 76 is in contact with the casing body 74. The projection insertion bores 122 are formed at the respective support projections 120. Then, the padding portions 110 and the support projections 120 are tightened with each other by the screw members 128, thereby strongly and securely maintaining the fitting between the cylindrical projections 112 and the projection insertion bores 122. The relative positional displacement between the casing body 74 and the casing cover 76 is further strongly restrained. Therefore, in combination with the fitting between the first fitting edge 114 and the second fitting edge 130, axes of the body side bearing portion 94 and the cover side bearing portion 106 supporting the helical gear 82 are prevented from being displaced. The stable mesh between the helical gear 82 and the worm gear 72 are ensured while a high bearing rigidity thereof is secured.

Further, the screw clamp hole 108 of each of the cylindrical projections 112 and the projection insertion bore (cylindrical hole) 122 are tightened at respective axial centers thereof by the screw member 128. Thus, the padding portions 110 and the support projections 120 contribute to space saving, thereby achieving a downsizing of the casing 80.

Furthermore, the casing body 74 and the casing cover 76 are both formed by lightweight resin, which leads to a reduced cost for an accurate fitting shape. The reduction in weight and cost for the entire speed reduction device 3 may be achieved accordingly.

Furthermore, the attachment between the casing body 74 and the casing cover 76 and the assembly of the whole casing 80 on the seat frame are simultaneously performed by the tightening of the padding portions 110 and the support projections 120 by the screw members 128. Thus, exclusive structures and components are not required individually for the attachment between the casing body 74 and the casing cover 76 and the assembly of the whole casing 80 on the seat frame. As a result, a reduction in manufacturing cost may be obtained. The attachment operation and the assembly operation are simultaneously performed to thereby improve operation efficiency. The casing body 74 and the casing cover 76 are attached with a highly strong structure for assembling the whole casing 80 on the seat frame. Thus, the casing body 74 and the casing cover 76 are further strongly assembled.

Figure 7:
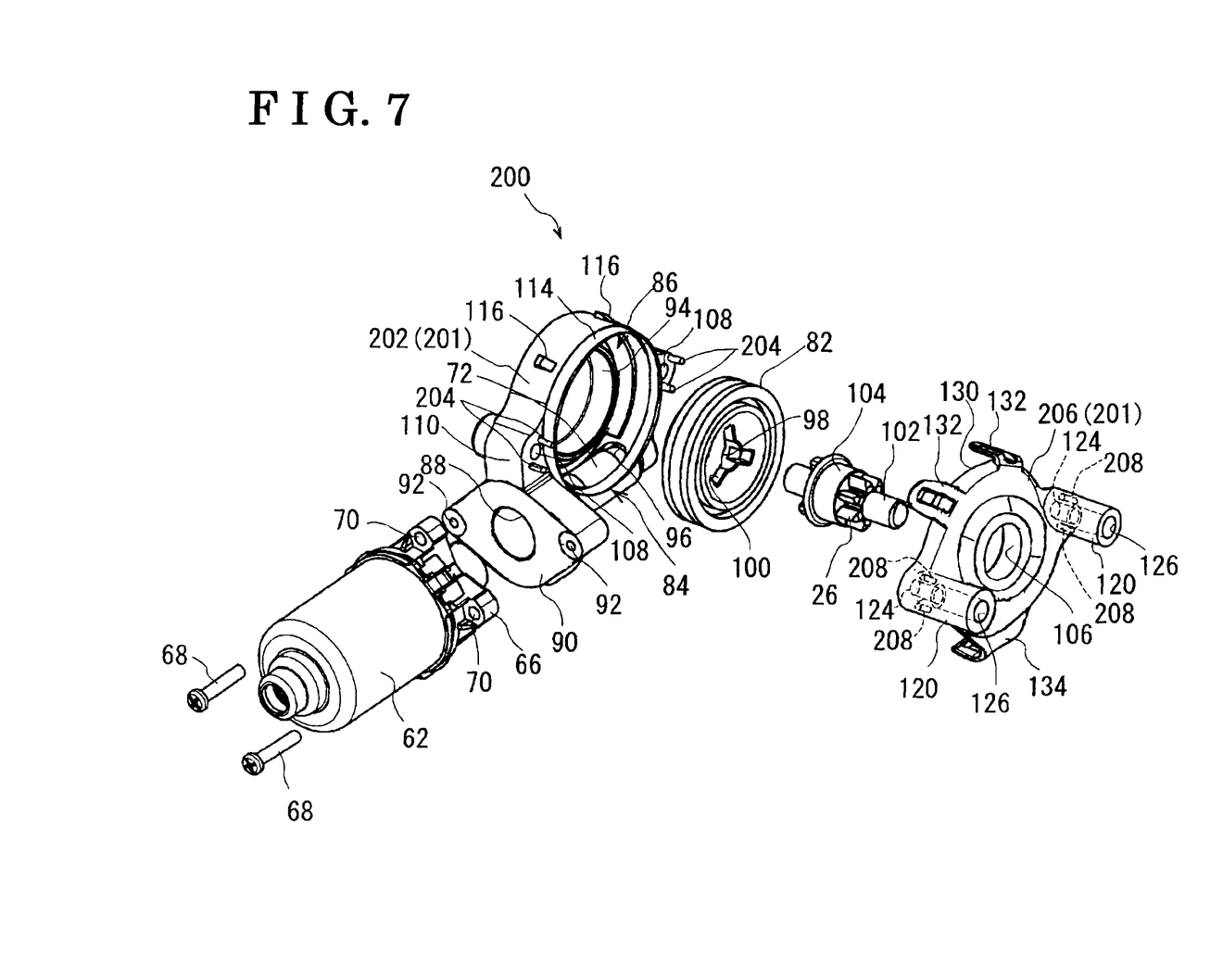
FIG. 7 is an exploded perspective view of a speed reduction device according to a second embodiment disclosed here.

A second embodiment of this disclosure will be explained with reference to FIG. 7. As illustrated in FIG. 7, a speed reduction device 200 of the second embodiment includes a casing 201 constituted by a casing body 202 and a casing cover 206 in the same way as the first embodiment. According to the second embodiment, a pair of round bar-shaped engagement projections 204 serving as the first engagement portions and projecting towards the casing cover 206 are formed at the outer circumferential side of each of the screw clamp holes 108 formed at the padding portion 110 of the casing body 202. Then, a pair of projection engagement bores 208 serving as the second engagement portions and being engageable with the respective engagement projections 204 are formed at the outer circumferential side of each of the through-holes 124 of the support projection 120 of the casing cover 206. The aforementioned structure of the second embodiment only differs from the first embodiment. The other structure, same as the first embodiment, therefore bears the same reference numerals as the first embodiment and an explanation will be omitted.

According to the speed reduction device 200 having the aforementioned structure, the casing body 202 and the casing cover 206 are attached to each other by the pair of engagement projections 204 formed at each of the padding portions 110 of the casing body 202 being fitted to the pair of projection engagement bores 208 formed at each of the support projections 120 of the casing cover 206.

Accordingly, the attachment position in the direction where the first fitting edge 114 and the second fitting edge 130 rotate relative to each other along the circular-shaped opening portion 78 is determined by the round bar-shaped engagement projections 204, for which molding is easily conducted, and by the projection engagement bores 208. As a result, a further reduction of the manufacturing cost may be achieved.

Figure 8:
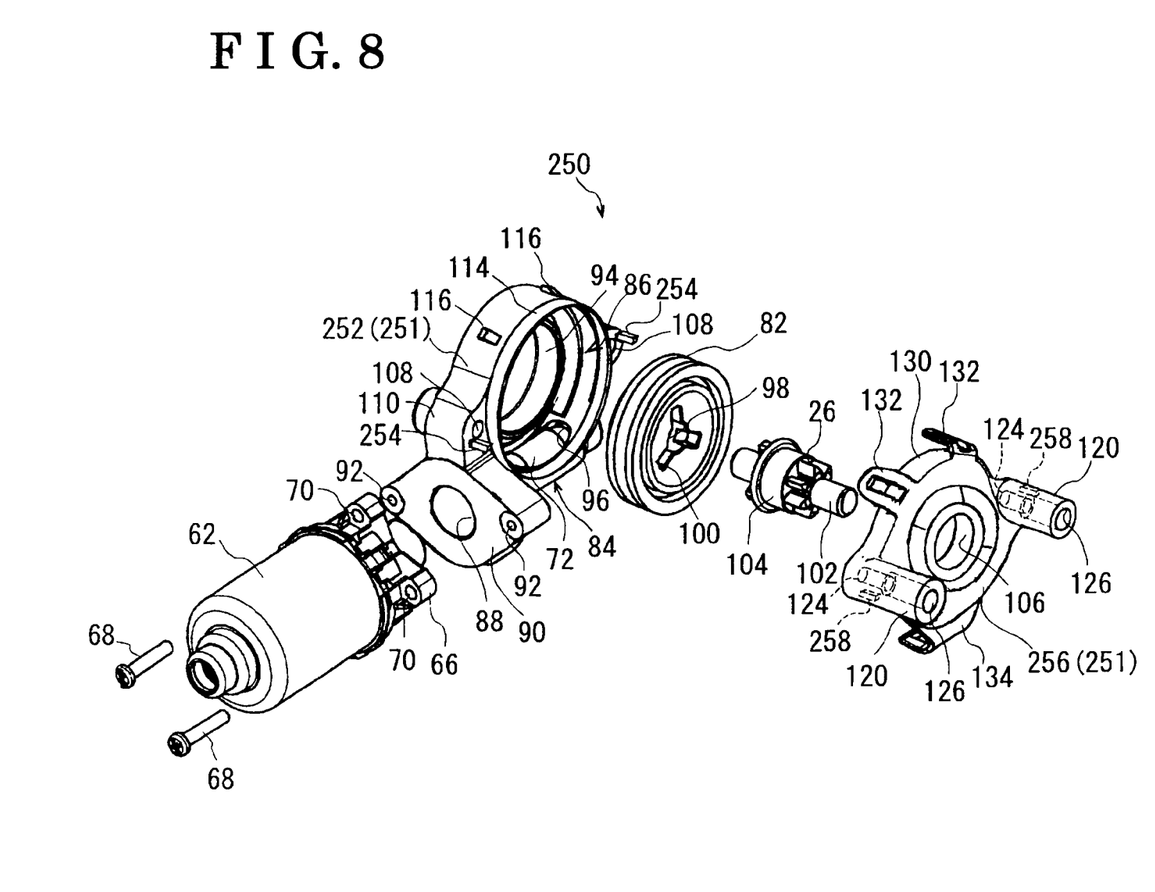
FIG. 8 is an exploded perspective view of a speed reduction device according to a third embodiment disclosed here.

A third embodiment of the disclosure will be explained with reference to FIG. 8. As illustrated in FIG. 8, a speed reduction device 250 according to the third embodiment includes a casing 251 constituted by a casing body 252 and a casing cover 256 in the same way as the first embodiment. According to the third embodiment, a prismatic projection 254 serving as the first engaging portion is formed, projecting towards the casing cover 256, at each of the padding portions 110 of the casing body 252. The prismatic projection 254 is arranged at the outer circumferential side of each of the screw clamp holes 108 that opens at an end portion of the padding portion 110. A square engagement bore 258 serving as the second engagement portion and being engageable with the prismatic projection 254 is formed at the outer circumferential side of each of the through-holes 124 that opens towards the casing body 252. The aforementioned structure of the third embodiment only differs from the first embodiment. The other structure same as the first embodiment therefore bears the same reference numerals as the first embodiment and an explanation will be omitted.

According to the speed reduction device 250 having the aforementioned structure, the casing body 252 and the casing cover 256 are attached to each other by the prismatic projection 254 formed at each of the padding portions 110 of the casing body 252 being fitted to the square engagement bore 258 formed at each of the support projections 120 of the casing cover 256. Accordingly, the attachment position in the direction where the first fitting edge 114 and the second fitting edge 130 rotate relative to each other along the circular-shaped opening portion 78 is determined by the prismatic projection 254, for which molding is easily conducted, and the square engagement bores 258. As a result, a further reduction of the manufacturing cost may be achieved.

According to the aforementioned first embodiment, the screw members 128 are tightened to the internal thread members 109 formed at the respective screw clamp holes 108 to thereby attach the casing body 74 and the casing cover 76 to each other. Alternatively, for example, an internal thread portion meshed with each of the screw members 128 may be formed at an inner peripheral wall of each of the screw clamp holes. Further alternatively, without the internal thread portions at the screw clamp holes, through-holes into which bolts (screw members) are inserted may be formed at both padding portions 110 of the casing body 74 and the support projections 120 of the casing cover 76. Then, the bolts are inserted into the through-holes and nuts may be tightened from a side facing the casing body.

According to the aforementioned embodiments, the casing body 74 and the casing cover 76 are formed by ABS resin. Alternatively, the casing body 74 and the casing cover 76 may be formed by resin reinforced by glass fiber, aramid fiber, or the like.

According to the aforementioned embodiments, the cylindrical projections 112 (first engagement portions) are formed at the padding portions 110 (the first assembly portions) of the casing body 74 while the projection insertion bores 122 (the second engagement portions) are formed at the support projections 120 (the second assembly portions) of the casing cover 76. Alternatively, for example, circular holes (the second engagement portions) may be formed at the first assembly portions while projecting engagement portions (the first engagement portions) fitted to the circular holes may be formed at the second assembly portions.

The aforementioned embodiments are only examples and may be modified or changed within a scope thereof.

According to the aforementioned first to third embodiments, the casing body 74, 202, 252 and the casing cover 76, 206, 256 are attached to each other via the first fitting edge 114 and the second fitting edge 130 formed at the respective contact surfaces A and B of the casing body 74, 202, 252 and the casing cover 76, 206, 256. Thus, the positioning of the casing body 74, 202, 252 and the casing cover 76, 206, 256 in the direction perpendicular to the attachment direction therebetween is easily conducted. In this case, the positioning in the direction where the casing body 74, 202, 252 and the casing cover 76, 206, 256 rotate relative to each other along the opening portion 78 is not achieved only by the first and second fitting edges (the annular fitting portions) 114 and 130. However, the first engagement portion 112, 204, 254 formed at the outer circumferential side of the first fitting edge 114 and the second engagement portion 122, 208, 258 formed at the outer circumferential side of the second fitting edge 130 are fitted to each other, thereby achieving the positioning of the casing body 74, 202, 252 and the casing cover 76, 206, 256 in the direction where the casing body 74, 202, 252 and the casing cover 76, 206, 256 rotate relative to each other along the opening portion 78. As a result, the position where the casing body 74, 202, 252 and the casing cover 76, 206, 256 are attached to each other is appropriately determined to thereby quickly and accurately assemble the casing body 74, 202, 252 and the casing cover 76, 206, 256 on each other. Further, the casing body 74, 202, 252 and the casing cover 76, 206, 256 are assembled on and tightened to each other in a state where the first and second fitting edges 114 and 130 are fitted to each other and the first engagement portion 112, 204, 254 engage with the second engagement portion 122, 208, 258. As a result, a relative positional displacement between the casing body 74, 202, 252 and the casing cover 76, 206, 256 in the direction perpendicular to the attachment direction and the direction where the casing body 74, 202, 252 and the casing cover 76, 206, 256 rotate relative to each other may be restrained. The stable mesh between the helical gear 82 and the worm gear 72, accommodated within the casing 80, 201, 251, is ensured while a high bearing rigidity is secured.

In addition, according to the aforementioned first to third embodiments, the casing body 74, 202, 252 and the casing cover 76, 206, 256 are both formed by a resin material.

The casing body 74, 202, 252 and the casing cover 76, 206, 256 are both formed by lightweight resin, which leads to a reduced cost for an accurate fitting shape. The reduction in weight and cost for the entire speed reduction device 3, 200, 250 may be achieved accordingly.

Further, the casing body 74, 202, 252 includes a plurality of padding portions (first assembly portions) 110 while the casing cover 76, 206, 256 includes a plurality of support projections (second assembly portions) 120 assembled on the respective first assembly portions 110, one of the first assembly portions 110 and the second assembly portions 120 each being provided with the first engagement portion 112, 204, 254 which projects from the contact surface A, the other of the first assembly portions 110 and the second assembly portions 120 each being provided with the second engagement portion 122, 208, 258 which has a hole shaped opening at the contact surface B and with which the first engagement portion 112, 204, 254 engages, and the casing body 74, 202, 252 and the casing cover 76, 206, 256 are tightened by the screw member 128 via the first assembly portions 110 and the second assembly portions 120.

A simple structure where the first engagement portions 112, 204, 254 each having the projecting shape and the second engagement portions 122, 208, 258 each having a hole shape engage each other achieves the easy and accurate determination of the relative position in the direction where the casing body 74, 202, 252 and the casing cover 76, 206, 256 rotate relative to each other along the opening portion 78. Further, because the first engagement portions 112, 204, 254 are formed at one of the first assembly portions 110 and the second assembly portions 120 while the second engagement portions 122 are formed at the other of the first assembly portions 110 and the second assembly portions 120, and the first and second assembly portions 110 and 120 are tightened to each other by the screw members 128, the engagement between the first engagement portions 112, 204, 254 and the second engagement portions 122, 208, 258 is securely maintained, thereby further strongly preventing the relative positional displacement between the casing body 74, 202, 252 and the casing cover 76, 206, 256.

The first engagement portion 112 is a cylindrical projection integrally formed at the contact surface A and the second engagement portion 122 is a circular hole opening at the contact surface B, the screw member 128 being arranged at an axial center of the cylindrical hole 108 formed at the cylindrical projection 112 and an axial center of the circular hole 122.

A simple structure where the cylindrical projection 112 is fitted to the circular hole (projection insertion bore) 122 achieves the easy and accurate determination of the relative position in the direction where the casing body 74 and the casing cover 76 rotate relative to each other along the opening portion 78. Further, the screw member 128 is arranged at respective axial centers of the cylindrical hole of the cylindrical projection 112 and the circular hole 122. Thus, the first assembly portions 110 and the second assembly portions 120 contribute to space saving, thereby achieving a downsizing of the casing 80.

The casing body 74, 202, 252 and the casing cover 76, 206, 256 are mounted at the seat frame 8 by the screw members 128 via the first assembly portions 110 and the second assembly portions 120 in a state where the casing body 74, 202, 252 and the casing cover 76, 206, 256 contact each other at the respective contact surfaces A and B.

Further, the attachment between the casing body 74, 202, 252 and the casing cover 76, 206, 256 and the assembly of the whole casing 80, 201, 251 on the seat frame 8 are simultaneously performed by the tightening of the padding portions (the first assembly portions) 110 and the support projections (the second assembly portions) 120 by the screw members (the tightening means) 128. Thus, exclusive structures and components are not required individually for the attachment between the casing body 74, 202, 252 and the casing cover 76, 206, 256 and the assembly between the whole casing 80, 201, 251 and the seat frame 8. As a result, a reduction in manufacturing cost may be obtained. The attachment operation and the assembly operation are simultaneously performed to thereby improve operation efficiency. The casing body 74, 202, 252 and the casing cover 76, 206, 256 are attached with a highly strong structure for assembling the whole casing 80, 201, 251 on the seat frame 8. Thus, the casing body 74, 202, 252 and the casing cover 76, 206, 256 are further strongly assembled.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A speed reduction device for a power seat adapted to be fixed to a seat frame, the speed reduction device comprising:
   a worm gear coaxially and integrally rotating with an output shaft of a motor:
   a helical gear meshed with the worm gear and coaxially and integrally rotating with a drive shaft driving a movable portion of the power seat; and
   a casing accommodating the worm gear and the helical gear to be rotatable;
   wherein the casing includes:

a casing body rotatably supporting the worm gear and including a circular-shaped opening portion through which the helical gear is inserted;

a casing cover tightened to the casing body and closing the opening portion of the casing body, such that contact surfaces of the casing body and the casing cover are engaged with each other;

annular fitting portions formed at contact surfaces of the casing body and the casing cover respectively and fitted to each other;

a first engagement portion formed at an outer circumferential side of the annular fitting portion of the casing body, the first engagement portion projecting from one of the contact surfaces of the casing body in an engaging direction towards the casing cover;

a second engagement portion formed with the casing cover and engaging with the first engagement portion, the second engagement portion including a hole shaped opening provided at the contact surface configured to receive the projecting first engagement portion; and a tightening means tightening the casing cover to the casing body, wherein the casing body and the casing cover are mounted to the seat frame by the tightening means via each of the first engagement portion and the second engagement portion in a state where the casing body and the casing cover contact each other at the respective contact surfaces, wherein the casing body includes a plurality of first assembly portions while the casing cover includes a plurality of second assembly portions assembled on the respective first assembly portions, the second assembly portions each including a region that projects away from the contact surfaces and having a through hole with a larger diameter than a diameter of the hole shaped opening provided at the contact surface, and wherein the casing body and the casing cover are tightened by the tightening means extending through the through holes of the second assembly portions and into the first assembly portions.

2. The speed reduction device according to claim 1, wherein the casing body and the casing cover are both formed by a resin material.

3. The speed reduction device according to claim 2, wherein the first engagement portion is a cylindrical projection integrally formed at one of the contact surfaces and the second engagement portion is a circular hole opening at the other of the contact surfaces, the tightening means being arranged at an axial center of a cylindrical hole formed at the cylindrical projection and an axial center of the circular hole.

4. The speed reduction device according to claim 3, wherein the casing body and the casing cover are mounted at the seat frame by the tightening means via the first assembly portions and the second assembly portions in a state where the casing body and the casing cover contact each other at the respective contact surfaces.

5. The speed reduction device according to claim 2, wherein one of the first assembly portions and the second assembly portions each being provided with the first engagement portion which projects from one of the contact surfaces, the other of the first assembly portions and the second assembly portions each being provided with the second engagement portion which has the hole shaped opening at the other of the contact surfaces and with which the first engagement portion engages, and the casing body and the casing cover are tightened by the tightening means via the first assembly portions and the second assembly portions.

6. The speed reduction device according to claim 5, wherein the first engagement portion is a cylindrical projection integrally formed at one of the contact surfaces and the second engagement portion is a circular hole opening at the other of the contact surfaces, the tightening means being arranged at an axial center of a cylindrical hole formed at the cylindrical projection and an axial center of the circular hole.

7. The speed reduction device according to claim 6, wherein the casing body and the casing cover are mounted at the seat frame by the tightening means via the first assembly portions and the second assembly portions in a state where the casing body and the casing cover contact each other at the respective contact surfaces.

8. The speed reduction device according to claim 5, wherein the casing body and the casing cover are mounted at the seat frame by the tightening means via the first assembly portions and the second assembly portions in a state where the casing body and the casing cover contact each other at the respective contact surfaces.

9. The speed reduction device according to claim 1, wherein one of the first assembly portions and the second assembly portions each being provided with the first engagement portion which projects from one of the contact surfaces, the other of the first assembly portions and the second assembly portions each being provided with the second engagement portion which has the hole shaped opening at the other of the contact surfaces and with which the first engagement portion engages, and the casing body and the casing cover are tightened by the tightening means via the first assembly portions and the second assembly portions.

10. The speed reduction device according to claim 9, wherein the first engagement portion is a cylindrical projection integrally formed at one of the contact surfaces and the second engagement portion is a circular hole opening at the other of the contact surfaces, the tightening means being arranged at an axial center of a cylindrical hole formed at the cylindrical projection and an axial center of the circular hole.

11. The speed reduction device according to claim 10, wherein the casing body and the casing cover are mounted at the seat frame by the tightening means via the first assembly portions and the second assembly portions in a state where the casing body and the casing cover contact each other at the respective contact surfaces.

12. The speed reduction device according to claim 9, wherein the casing body and the casing cover are mounted at the seat frame by the tightening means via the first assembly portions and the second assembly portions in a state where the casing body and the casing cover contact each other at the respective contact surfaces.

13. The speed reduction device according to claim 1, wherein the first engagement portion is a cylindrical projection integrally formed at one of the contact surfaces and the second engagement portion is a circular hole opening at the other of the contact surfaces, the tightening means being arranged at an axial center of a cylindrical hole formed at the cylindrical projection and an axial center of the circular hole.

14. The speed reduction device according to claim 13, wherein the casing body and the casing cover are mounted at the seat frame by the tightening means via the first assembly portions and the second assembly portions in a state where the casing body and the casing cover contact each other at the respective contact surfaces.

15. The speed reduction device according to claim 1, wherein the hole of the second engagement portion includes a bottom surface that faces an end portion of the projecting first engagement portion.

* * * * *